United States Patent [19]

Arendt

[11] 4,143,313
[45] Mar. 6, 1979

[54] AUTOMOTIVE VOLTAGE REGULATOR TO CONTROL VOLTGE SUPPLY TO AN ON-BOARD VEHICLE NETWORK

[75] Inventor: Armin Arendt, Munich, Fed. Rep. of Germany

[73] Assignee: Robert Bosch GmbH, Stuttgart, Fed. Rep. of Germany

[21] Appl. No.: 834,000

[22] Filed: Sep. 16, 1977

[30] Foreign Application Priority Data

Oct. 2, 1976 [DE] Fed. Rep. of Germany ....... 2644643

[51] Int. Cl.$^2$ .............................................. H02J 7/14
[52] U.S. Cl. ....................................... 322/28; 322/99; 320/64
[58] Field of Search ...................... 322/28, 99; 320/64, 320/68

[56] References Cited

U.S. PATENT DOCUMENTS

| | | | |
|---|---|---|---|
| 3,491,285 | 1/1970 | Nowakowski | 322/73 X |
| 3,612,982 | 10/1971 | Jones et al. | 322/28 |
| 3,855,517 | 12/1974 | Allport | 322/28 X |
| 3,942,097 | 3/1976 | Itoh et al. | 320/64 X |

*Primary Examiner*—Robert J. Hickey
*Attorney, Agent, or Firm*—Flynn & Frishauf

[57] ABSTRACT

To permit selective control of the voltage level of the on-board vehicle network as a function of battery voltage or exciter field control voltage of an automotive alternator, and continued operation of the regulator in spite of malfunction of control connections to the regulator, a voltage divide which supplies a voltage regulating element is formed with an additional tap thereon, the additional tap being connected to a current supply which supplies current to the voltage regulator to modify the voltge level of the tap supplying the control potential to the voltage regulator. The voltge regulator includes a controlled semiconductor switch which is selectively energized in accordance with voltage level at the main tap of the voltage divider with respect to a reference level. If, as customary, the control voltage is the battery voltge, a switch-over circit in the regulator changes the command voltage to the field exciter voltage in case of a break in the connection between generator and battery, control is effected with respect to a constant voltage, the break being indicated by faint illumination of the charge control indicator lamp, or discharge of a battery charge indicator instrument to supply a warning indication.

6 Claims, 1 Drawing Figure

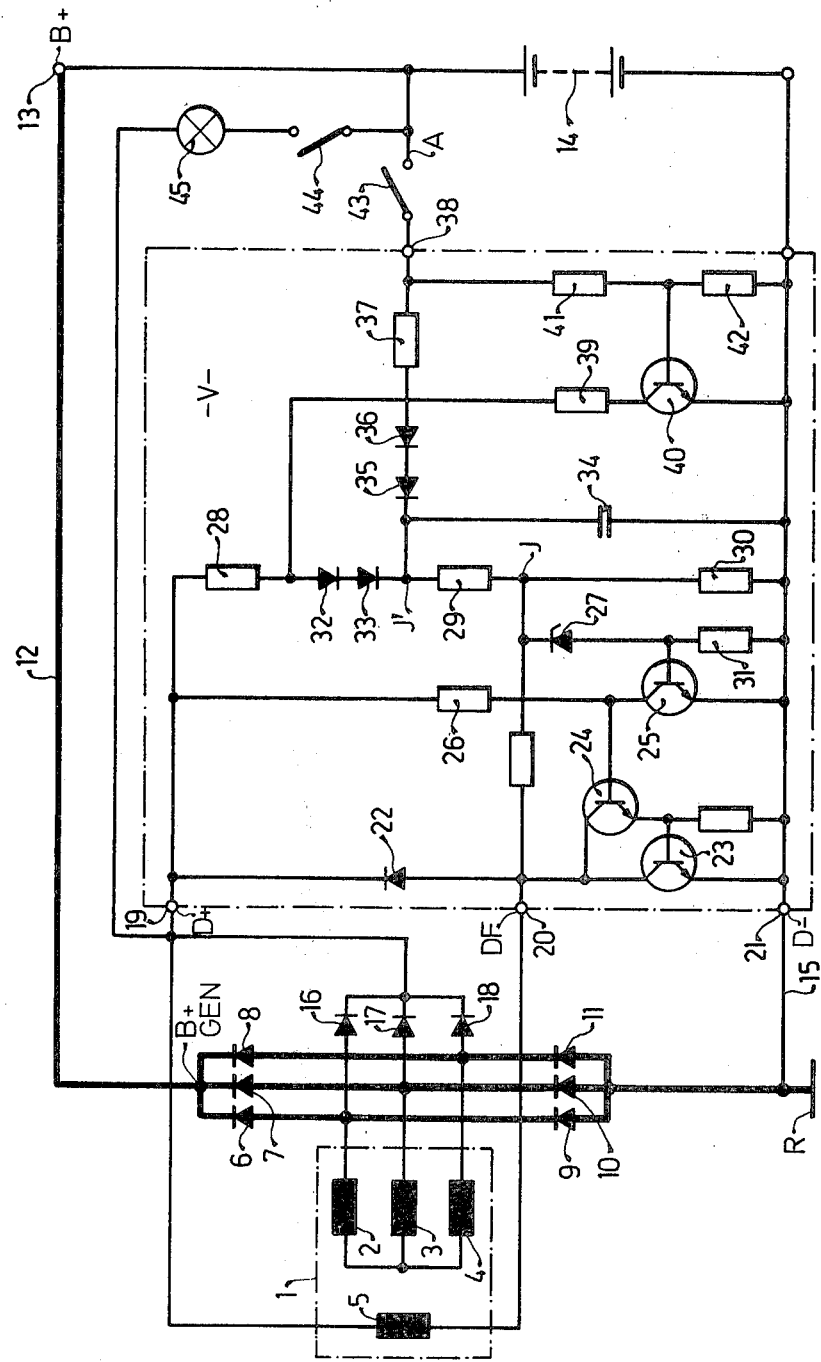

AUTOMOTIVE VOLTAGE REGULATOR TO CONTROL VOLTGE SUPPLY TO AN ON-BOARD VEHICLE NETWORK

The present invention relates to a voltage regulator and more particularly to an automotive type voltage regulator to control the on-board voltage of a vehicular electrical network.

BACKGROUND AND PRIOR ART

It has previously been proposed to control the output voltage of automotive type generators, typically alternators connected to rectifiers by using a control circuit or control loop in which the command voltage is the d-c output voltage of the generator, that is, typically the rectified voltage derived from the generator. Alternatively, the voltage on a battery of the vehicle can be used. Still, various types of rectifier systems use separate diodes to rectify current to the exciter field of the alternator, and the output voltage at the rectifying diodes for the exciter field may likewise be used as a command, or control voltage for the voltage regulator. There is a difference in the voltage levels of these three command or control voltages: some voltage drop arises in the power connection between the generator and the battery, voltage drop due to the diode voltages of the rectifier diodes; and voltage drop due to the diode voltages of the exciter rectifier diodes. The voltage drop on the power connection, and the voltage drop across the diodes of the rectifiers is dependent on the loading of the network.

Various types of control circuits have been proposed for different types of vehicles and for different uses of the resulting generator charging and voltage control system. When the command or control voltage is the battery voltage, the type of control is usually referred to as B+ control; controlling the voltage based on the d-c output voltage of the alternator, that is, the d-c voltage supplied by the power generator is referred to as B+Gen control. If voltage control is effected by sensing the voltage at the field exciter diodes, the control is usually referred to as D+ control.

B+ control requires a separate connection from the battery to the voltage regulator to supply the command or control voltage actually at the battery as a command value to the voltage regulator. The battery and voltage regulator are frequently located physically at separate positions and, in motor vehicles, may be spaced a good distance from each other. Thus, then, requires a control line of substantial length. This control line is subject to damage, for example failure, or break therein. Upon interruption of the control line, battery voltage will no longer be applied to the voltage controller; rather, the then applied level will be zero. Although the battery may be fully charged, the voltage regulator would react as if the alternator battery had zero voltage and, therefore, the alternator is commanded to supply more and more power at higher and higher voltages. This may lead to damage and possibly destruction of the alternator and/or the battery and/or the voltage regulator. Similar erroneous control may occur if the power connection between the alternator and the battery might break. This, also, opens the control loop and the generator is controlled to supply output voltages at a higher level which, however, it can no longer supply to the battery. If this condition persists for any appreciable period of time, both the alternator as well as the voltage regulator may be damaged or destroyed.

THE PRESENT INVENTION

It is an object of the present invention to provide a voltage regulator which, under normal conditions, is controlled by B+ control which additionally, however, upon interruption of the connection supplying the command or sensing voltage to the regulator does not carry out control steps which may damage the voltage regulator, the battery, or the alternator; and which, additionally, upon a break of the power connection from the alternator, will not control the alternator to assume dangerous voltage levels.

Briefly, the voltage regulator includes a voltage sensing circuit which has a voltage divider and a voltage sensing element, typically a Zener diode which provides a reference voltage. The voltage regulator includes a semiconductor controlled switch, typically a transistor, which selectively supplies electrical current to the field of the alternator. In accordance with the invention, an additional tap is placed on the voltage divider, and a current supply source is connected to the additional tap to modify the voltage level at the main tap of the voltage divider from which the semiconductor controlled switch is, in turn, controlled. Preferably, blocking diodes are connected between the battery and the additional tap, and between the supply to the voltage regulator and the voltage divider, so that the higher one of the voltages will normally control but upon failure of that voltage, the other may take over. For example, one connection may be to the exciter field, the other to the battery.

The system reliably controls the output voltage of the alternator to a reasonable level at which the alternator, or the regulator cannot be damaged. A break in the load or power output line from the alternator additionally can easily be indicated by slight illumination of a charge control lamp, or indication of discharge by a charge meter. The system is easily constructed as a modification to well known voltage regulator circuits by use of the already frequently used temperature compensating diodes in the form of switching diodes and the addition of only a few circuit elements.

The drawing, illustrating an example is a schematic circuit diagram of a battery charging system for an automotive vehicle including the voltage regulator of the present invention.

An automotive-type alternator 1 has a field 5 and three armature windings 2, 3, 4. The armature windings are connected to a bridge rectifier having rectifier diodes 6-11, in two sets of diodes 6-8 and 9-11. Additionally, three exciter diodes 16, 17, 18 are connected to the output terminals of the armature windings 2, 3, 4 to provide exciter field current, as well known. The cathodes of diodes 6, 7, 8 are connected to a power output line 12 and hence to the positive terminal 13 of an automotive vehicle battery 14. The anodes of diodes 9-11 are connected together and are, in turn, connected to ground, or chassis, or reference terminal R. The cathodes of the exciter diodes 16, 17, 18 are connected to a first input terminal 19 of the voltage regulator V. Terminal 19 is, additionally, connected to one terminal of the field 5. The other terminal of field 5 of the alternator 1 is connected to a second input terminal 20 of the voltage regulator. A third input terminal 21 of the voltage regulator is connected to the chassis or reference terminal R, which is also connected to a common chassis bus 15, which may be formed by the structure of the vehicle. A free wheeling, or anti-inductive kick diode 22 is connected across the field 5, that is, across terminals 19, 20. A semiconductor electronic controlled switch formed of Darlington transistor unit 23, 24 is connected between terminal 20 and the chassis terminal 21. The semiconductor controlled switch 23, 24 is, in turn, controlled by conduction of a transistor 25. The collector of switching transistor 25 is connected to the base of transistor 24; the emitter of transistor 25 is connected to reference bus 15. The base of switching transistor 25 is connected to the junction between a Zener diode 27 and resistor 31. The other terminal of Zener diode 27 is connected to a main sensing tap or junction J of the voltage divider formed by resistors 28, 29, 30. The voltage divider 28, 29, 20 is connected between the terminal 19—connected to the output of the field exciter diode 16, 17, 18 and chassis bus 15. A diode, or a series connection of several diodes 32, 33 is connected between the resistors 28, 29 of the voltage divider. The cathode of the diode 33 is connected through a blocking capacitor 34 to chassis bus 15. The cathode of diode 32, 33 forms a second junction J' with resistor 29. This second junction or tap point J' is connected to a further diode, or, as shown, a plurality of series connected 35, 36 and a resistor 37 to a fourth input terminal 38. The diodes 32/33 and 35/36 are so connected that their cathodes face the second junction J'. The anodes of the diodes 32/33 are connected to a collector resistor 39 which, in turn, is connected to the collector-emitter path of a further transistor 40, the emitter of which is connected to chassis or ground bus 15. The base of transistor 40 is connected from the tap point of a voltage divider formed by resistor 41, 42 and connected between the resistor 37 and ground or chassis bus 15, that is, between terminal 38 and terminal R. A switch 43 connects terminal 38 to a connection line A which leads to the positive terminal 13 of battery 14. The positive terminal 13 is additionally connected through a switch 44 by part of the ignition switch to a charge control indicator lamp 45 and then to terminal 19 and the exciter diode triple 16, 17, 18.

The input terminal terminal 19 is referred to as a D+ terminal; the second input terminal 20 as a DF terminal; terminal 21 as a D— terminal; the cathodes of diode 6-8 as B+Gen; and a positive terminal 13 of a battery 14 as B+. The terminology of control then, consistently, is referred to as D+ control if the command signal is derived from the exciter diodes and as B+ if the command signal is derived from the battery.

Operation: If switch 43 is open, or if the connecting line A should be interrupted, the circuit operates in D+ mode of operation. Switching transistor 23 is, initially, conductive. A rising current will then flow from the cathode of the exciter diode 16–18 through field 5 and through the collector-emitter path of transistor 23 to chassis. As the current rises in field winding 5, the output voltage of the alternator 1 rises. This raises the voltage level at the terminal 19. When this voltage level has a reached a predetermined value, Zener diode 27 becomes conductive. This controls transistor 25 to be conductive, dropping the base voltage of the switching transistors 23, 24 which will then block. Current will be interrupted thorugh the field winding 5 and will drop until the voltage at terminal 19 has reached a value which is so low that Zener diode no longer is conductive. This, then, controls the transistor 25 into blocked state, causing transistors 23, 24 to become conductive and the cycle will repeat. In this manner—and as known—field winding 5 receives more or less effective current and thus controls the output voltage of the alternator 1. The command signal is the signal derived from the D+ terminal, that is, the exciter voltage available from diode 16, 17, 18.

Let it now be assumed that switch 43 is closed and that line A is in proper operating order. This applies current through the voltage divider 41, 42 to the base of transistor 40 which will become conductive, thus dropping the voltage of the anodes of diodes 32, 33 to a low value, and to a level which is less than their cathodes. Diodes 32, 33 therefore will block. The battery voltage connected over switch 43, resistor 37 and diodes 35/36 will now be applied to the junction J'. Upon change of battery voltage at the positive terminal 13 above a predetermined upper or lower level, Zener diode 27 will become conductive, and non-conductive, as above described, and thus causes switch-over of the transistor 23, 24. Control of current through the field 5 will in this mode of operation be commanded by battery voltage, thus, the control will be B+ control since battery voltage as such is the command level for the voltage regulator V. To supply this battery voltage to the voltage regulator V, a cable schematically indicated by the connection A is needed. The cable need not carry heavy current but supplies a sensing voltage, connected between the fourth input terminal 38 and the positive terminal 13 of vehicle battery 14.

Due to malfunction, damage, or for other causes, cable A may break. Electrically, this is the same as opening of switch 43. If switch 43 is opened, transistor 40 will block and the anode of diode 32/33 will again receive a higher voltage than its cathode. The command level thus will again be the exciter voltage available at the D+ terminal 19.

The circuit of the present invention is effective to compensate for yet another malfunction in the electrical on-board network. A further interruption may occur by a break in the power cable 12 while the alternator, as would be usual, is operated in the B+ mode of operation. Loads, such as the ingnition system of the vehicle, headlamps, and other appliances and connected to the B+ terminal will now drain current from battery 14 which will discharge slowly over the loads. The voltage at terminal 13 will drop gradually. When this voltage has dropped below a certain level, the voltage at cathodes 32,33 will become less than the voltage at its anodes. This causes the diodes 32/33 to become conductive. The voltage regulator will revert under those conditions again to the D+ operating mode as above described if the quiescent current flowing through transistor 40 can be neglected. This quiescent current, however, does have an effect, namely that the output voltage at the alternator is controlled to become slightly greater than the desired voltage thereof. The excess voltage can be set by suitable dimensioning of the circuit element 39, 41, 42 and transistor 40. The lamp 45 will light since the voltage at terminal 13 will drop with respect to the exciter output voltage at terminal 19; initially, since a residual voltage is left in a battery 14, the illumination of lamp 45 will be faint, becoming increasingly brighter as the difference between the voltage at terminal 13 and terminal 19 increases.

Various changes and modifications may be made within the scope of the inventive concept.

I claim:

1. Automotive voltage regulator to control the output voltage of an automotive vehicular alternator in a vehicular on-board network, in which the network includes
- a battery (14) charged by the alternator and having one terminal connected to ground chassis (21, R) and the other to a load junction (13);
- said regulator having a first terminal (D+, 19) connected to the field terminal of the field (5) of the alternator (1);
- a second terminal (DF, 20) connected to the other field terminal of the field (5) of the alternator (1);
- A third terminal (D−, 21) connected to a chassis, or reference connection (R, 15) of the battery of the vehicle;
- a switching semiconductor controlled switch (23, 24) connected between the second and third terminals (DF, 20; D−, 21);
- a voltage sensing circuit including a voltage sensing element (27) and a voltage divider (28, 32, 33, 29, 30), the voltage divider being connected between the first and third terminals (D+, 19; D−, 21) to thereby connect the voltage divider across the supply to the field of the alternator (1), the voltage sensing element (27) being connected to a first tap (J) on the voltage divider and further to control a semiconductor controlled switch (23, 24);
- a second tap (J') on said voltage divider positioned between the first tap (J) and the first terminal (19, D+);
- current supply means (35, 36, 37, 38; 43, A) connected to the second tap of said voltage divider to modify the current through the voltage divider and hence the voltage controlling the semiconductor controlled switch;
- the voltage divider (28, 32, 33, 29) connected between the first tap (J) and the first terminal (D+, 19) comprising two resistor elements (28, 29) and at least one diode (32, 33) serially connected between said resistor elements whereby one resistor element (28) will be connected to the first terminal (D+, 19) and the other resistor element (29) will be connected to the first tap (J);
- a bypass transistor (40) having its emitter-collector path connected to the junction between said at least one diode (32, 33) and the resistor element (28) connected to said first terminal (D+, 19);
- and means (41, 42) controlling conduction of said bypass transistor as a function of battery voltage.

2. Regulator according to claim 1, wherein the current supply means includes a connection (A, 38) from the other, or load junction (B+, 13) terminal of the battery to the voltage divider.

3. Regulator according to claim 1, wherein the current supply means includes a connection (A, 38) from the other, or load junction (B+, 13) terminal of the battery to the voltage divider;
- and at least one further diode (35, 36) connecting said connection from the battery (A, 38) to the junction between said at least one diode of the voltage divider and the resistor adjacent said first tap, said junction forming said second tap (J').

4. Regulator according to claim 1, wherein the current supply means includes a connection (A, 38) from the other, or load junction (B+, 13) terminal of the battery to the voltage divider;
- and wherein said means controlling conduction of the bypass transistor (40) comprises a voltage divider (41, 42) connected to the connection (38, A) to the load junction (13, B+) of the battery, said bypass transistor being controlled by the battery voltage to conduction if the battery voltage has a predetermined level, thereby dropping the voltage level at said at least one diode and applying the voltage from the battery to said second junction (J').

5. Regulator according to claim 4, wherein said alternator has a separate field rectifier (16, 17, 18), the field rectifier being connected to said first terminal (D+, 19) to supply rectified power to said field and additionally provide a command output voltage representative of output of the alternator to said first terminal.

6. Regulator according to claim 3, further including a charge control lamp (45) connected between said first terminal (D+, 19) and said connection (38, A) to the load junction (13) of the battery (14).

* * * * *

UNITED STATES PATENT AND TRADEMARK OFFICE
CERTIFICATE OF CORRECTION

PATENT NO. : 4,143,313
DATED : March 6, 1979
INVENTOR(S) : Armin ARENDT

It is certified that error appears in the above-identified patent and that said Letters Patent are hereby corrected as shown below:

Claim 1, column 5, line 36 after "(28, 32, 33, 29)" insert -- having a divider branch (28, 32, 33, 29) --

Claim 6, first line, column 6, line 39, change "claim 3" to -- claim 5 --

IN THE TITLE, second line, change "voltge" to

Signed and Sealed this

Seventeenth Day of July 1979

[SEAL]

Attest:

LUTRELLE F. PARKER
*Attesting Officer*   *Acting Commissioner of Patents and Trademarks*